(12) United States Patent
Lee (10) Patent No.: US 8,641,155 B2
(45) Date of Patent: Feb. 4, 2014

(54) MODULAR FURNITURE SYSTEM

(76) Inventor: David Lee, Oakdale, MN (US)

( * ) Notice: Subject to any disclaimer, the term of this patent is extended or adjusted under 35 U.S.C. 154(b) by 990 days.

(21) Appl. No.: 12/179,388

(22) Filed: Jul. 24, 2008

(65) Prior Publication Data

US 2009/0026163 A1  Jan. 29, 2009

Related U.S. Application Data

(60) Provisional application No. 60/952,238, filed on Jul. 26, 2007.

(51) Int. Cl.
*A47B 87/00* (2006.01)

(52) U.S. Cl.
USPC .......................................... 312/110; 312/108

(58) Field of Classification Search
USPC .......... 312/108, 109, 111, 140; 403/402, 403, 403/381, 382; 52/592.1, 581, 588.1, 589.1, 52/591.1
See application file for complete search history.

(56) References Cited

U.S. PATENT DOCUMENTS

| | | | | |
|---|---|---|---|---|
| 3,856,147 | A | * | 12/1974 | Piretti ............................ 312/108 |
| 4,676,038 | A | * | 6/1987 | Doyon et al. ................. 52/282.2 |
| 5,466,057 | A | * | 11/1995 | Blankenburg ................. 312/108 |
| 5,477,594 | A | * | 12/1995 | LePage ......................... 312/111 |
| 5,647,181 | A | * | 7/1997 | Hunts ........................... 52/282.1 |
| 5,888,114 | A | | 3/1999 | Slocum et al. |

FOREIGN PATENT DOCUMENTS

| | | |
|---|---|---|
| DE | 816011 C | 1/1952 |
| EP | 0898086 A2 | 2/1999 |
| GB | 976022 A | 11/1964 |

OTHER PUBLICATIONS

Smart Furniture, 6x3 Stacked Storage Cubes, www.smartfurniture.com, Aug. 14, 2008.
Smart Furniture, 6' Wide Classic Bookshelf, www.smartfurniture.com, Aug. 14, 2008.
Smart Furniture, Smart Cubes, www.smartfurniture.com, Aug. 14, 2008.
Smart Furniture, Cubitec Shelving, www.smartfurniture.com, Aug. 14, 2008.
Smart Furniture, Chicago 8 Box, www.smartfurniture.com, Aug. 14, 2008.
Smart Furniture, Modu-licious 6, www.smartfurniture.com, Aug. 14, 2008.
International Search Report and Written Opinion of the International Searching Authority from Patent Cooperation Treaty Application No. PCT/US2008/071115, dated Oct. 17, 2008, pp. 1-11.

* cited by examiner

*Primary Examiner* — Hanh V Tran
(74) *Attorney, Agent, or Firm* — Haynes and Boone, LLP (57) ABSTRACT

A modular furniture system is provided. The system includes surface members, junctions, and connectors. Each connector has two engagement portions. The surface members and junctions each include one or more channels for receiving a connector, the channels are shaped to slidingly attach with an engagement portion of a connector. The channels are positioned so that the connectors being used to interconnect a surface member to a junction or a surface member to another surface member to assemble the modular furniture system.

1 Claim, 13 Drawing Sheets

Samples from the universal Part Number Format:
Type –Standard Section Length –Thickness – Depth Types
    S1 = 1-section Surface Member
    SX = X-section Surface Member
    G1 = 1-section grooved Surface Member
    GX = X-section grooved Surface Member
    P1 = 1-section post
    PX = X-section Post
    J = Junction
    C90R = Corner, Round, 90/270 degrees
    C90S = Corner, Sharp, 90/270 degrees
    C45R = Corner, Round, 45/235 degrees, etc.
    C = Connector
    NC = Notched Connector
    F = Filler
    NF = Notched Filler
    SF – Primary Surface Attachment Filler
    EA – End attachment Filler
Standard Section Length
    3 = 3 inches
    6 = 6 inches
    12 = 12 inches
    18 = 18 inches
Thickness
    1 = 1 inch
    2 = 2 inches
Depth
    12 = 12 inches
    18 = 18 inches
Applying the above part numbering system, the part number for a one-section
    Surface Member from the preferred embodiment would be "S1-18-2-12."

Fig. 23

MODULAR FURNITURE SYSTEM

CROSS REFERENCE

This patent claims the benefit of U.S. Ser. No. 60/952,238 filed on Jul. 26, 2007, the disclosure of which is hereby incorporated by reference.

BACKGROUND

Furniture systems such as shelves, cabinets, stands, and desks are typically: 1) pre-built (in standard sizes and configurations), 2) build-to-order (to customer design specifications), or 3) modular systems (customer configurable components which collectively comprise the final furniture unit). An advantage of pre-built furniture is low selling price (due to manufacturing efficiencies from high volume production), but a disadvantage is limited variety of sizes and configurations. An advantage of build-to-order furniture is that the furniture can be custom sized and configured, but a disadvantage is higher selling price. An advantage of modular furniture systems is high customization and flexible design, but a disadvantage is limited configuration possibilities. Additional advantages and disadvantages to all systems are well known to those with ordinary skills in the art.

What is needed is a furniture system that shares the advantages of pre-built, build-to-order, and modular systems, without the disadvantages.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 1b, 1c, and 1d are blowout views of the shelf system in FIG. 1a.

DESCRIPTION OF THE EMBODIMENTS

The present invention provides a novel furniture system, a novel connection system, and methods of ordering, building and providing such systems. For the sake of example, the following description will describe various embodiments of the present invention. Some embodiments will achieve features and advantages that other embodiments do not, and no feature or advantage is considered to be critical to the invention, except as specifically described in the claims.

It is understood that several components or steps may be only briefly described, such being well known to those of ordinary skill in the art. Also, additional components or steps can be added, and certain of the following can be removed and/or changed while still implementing the claimed invention. For example, an intermediate component can be placed between two disclosed components in a manner known to those of ordinary skill in the art. Thus, the following description should be understood to represent examples only, and is not intended to suggest that one or more steps are required.

Figure 1A:
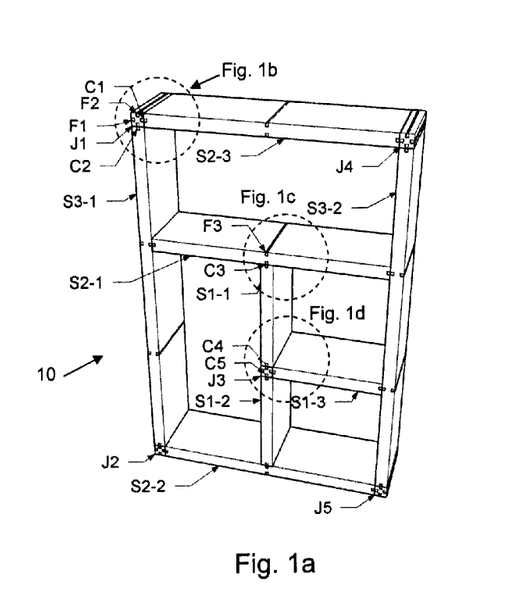
FIG. 1a provides a perspective view of a shelf system according to one embodiment of the present invention.
Figure 1B:
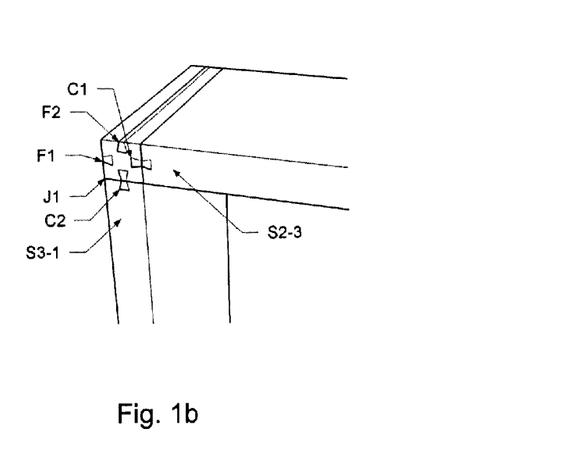
Figure 1C:
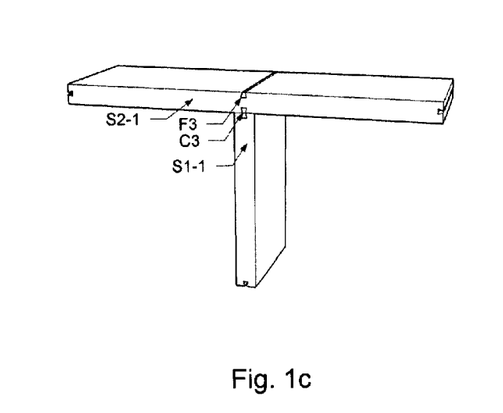
Figure 1D:
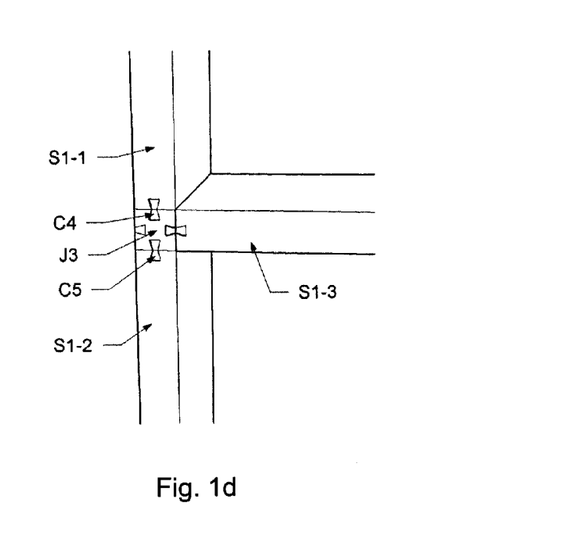

Referring now to FIG. 1a, the reference numeral 10 refers to a shelf system according to one embodiment of the present invention. FIGS. 1b, 1c and 1d are blowouts from FIG. 1a to facilitate further discussion below. The Shelf System 10 includes three basic components: Surface Members, Junctions, and Connectors. Additional components and modifications to the three basic components can be used for advanced customization and aesthetic purposes. A description of these three components, as well as some other components, is provided below, followed by a description of how these components are used in the Shelf System 10.

Surface Members, for the sake of reference, will be designated with a prefix "S." Surface Members are the dominant vertical and horizontal planes of the final assembly. A Horizontal Surface Member could be described as a "shelf" whereas a Vertical Surface Member could be described as a "divider," "wall," or "shelf support." Any standard Surface Member may be oriented for use as either a Horizontal Surface Member or a Vertical Surface Member. Standard Surface Members are block-shaped (using only straight edges and right angles), although special non-block shapes may be used in advanced embodiments, as described further below. A "primary surface" of a Surface Member is the largest surface area of the member. Surface Members may be decorative in various manners, such as having routings (e.g., fluting) and other designs. The Shelf System 10 in FIG. 1a includes eight Surface Members S1-1, S1-2, S1-3, S2-1, S2-2, S2-3, S3-1, and S3-2.

Junctions, for the sake of reference, will be designated with a prefix "J." The Shelf System 10 in FIG. 1a includes five Junctions, J1, J2, J3, J4, and J5, which are of identical size and shape. When necessary, Junctions bridge the gap between Surface Members which require connection. There are two common instances where Junctions are used: 1) to join in-line Surface Members and 2) to join the ends of perpendicular Surface Members. In the present embodiment, when connecting the end of one Surface Member to another Surface Member at a location other than the end, a Junction is not needed. Also in the present embodiment, a Junction will not join to another Junction.

Channels, for the sake of reference, will be designated with a prefix "CH." Channels enable the insertion of a Connector (defined below) to join Surface Members and Junctions. The Channels in Junctions and Surface Members are distributed at standard distances such that the Channels on touching Surface Members and Junctions align when the design rules (defined below) are followed.

Figure 6:
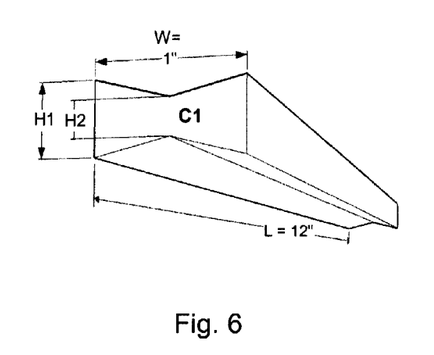
FIG. 6 provides a perspective view of a Connector, C1, that can be used in the Shelf System 10 of FIG. 1.

Connectors, for the sake of reference, will be designated with a prefix "C." Connectors are elongated shafts that slide into adjacent Channels on Surface Members and Junctions (Connectors may also be used to fasten accessories to the final assembly as described later). A sample Connector, C1, of a trapezoidal or dovetail shape is seen in FIG. 6. There are 16 Connectors shown in FIG. 1*a*, of which five are labeled C1, C2, C3, C4 and C5.

Connectors enable three primary connections between Surface Members and Junctions: 1) the joining of in-line Surface Member and Junctions, 2) the joining of abutted perpendicular Surface Members, and 3) the joining of common-corner Surface Members.

Connectors that join in-line Surface Members and Junctions are seen in FIG. 1*d* where Surface Member S1-2 fastens to Junction J3 by Connector C5, and where Junction J3 fastens to Surface Member S1-1 by Connector C4, thereby joining Surface Members S1-2 and S1-1.

Connectors that join common-corner Surface Members are seen in FIG. 1*b* where Surface Member S3-1 fastens to Junction J1 by Connector C2, and where Junction J1 joins to Surface Member S2-3 by Connector C1, thus creating a common corner between Surface Members S3-1 and S2-3.

Connectors that join abutted perpendicular Surface Members are seen in FIG. 1*c* where Surface Member S2-1 connects directly to the perpendicular abutted Surface Member S1-1 by Connector C3.

It is noted that the cross section of the Connectors is shown as being symmetrical, i.e., a "double dovetail" or "bowtie" configuration. As described above, the Junctions and the Surface Members all have similar-sized Channels, so the Connectors are symmetrically configured. However, other embodiments may utilize Connectors that are of different shapes or that are non-symmetrical. Other shapes may include a capital "I" or a "Figure 8", which prevent vertical or horizontal movement while allowing insertion and removal along the depth of the assembly. Non-symmetrical Connectors may be used to enable the joining of different sized Surface Members and Junctions. Furthermore, the sides of connectors may be different in both size and shape.

Fillers, for the sake of reference, will be designated with a prefix "F." Fillers are an alternate form of a Connector, designed to fill unused Channels in Junctions and Surface Members for aesthetic purposes (or to enable the attachment of accessories as described below). Fillers could be described as Connectors that have been "rip cut" lengthwise, as shown by Filler F1 in FIG. 7. There are 17 Fillers shown in FIG. 1*a*, of which three are labeled F1, F2 and F3. Fillers F1 and F2 are also shown in FIG. 1*b*. The Fillers F1 and F2 fill the exterior channels of the Junction J1 (in FIG. 1*b*), and the Filler F3 fills one of the exterior channels of the Surface Member S2-1 (in FIG. 1*c*).

It is understood that some Channels may be left open, without a Filler or Connector, as would be desired for various reasons.

Materials for all components may be quite varied due to the inherent strength of the components, connections and structure, which distribute load forces across the full depth of all components. Combinations of materials may also be used to achieve various cost targets, appearance, and function. For example, wood skins may enclose torsion box cores. Or, for aesthetic purposes, metal Connectors may be used with wood Surface Members. For cost and functionality purposes, plastic may be used throughout for light industrial or home garage solutions.

Component Dimensions

In the present embodiment, the components of the Shelf System 10 have a set of geometries which ensure alignment of the Channels of all Surface Members and Junctions regardless of their configuration.

Figure 2:
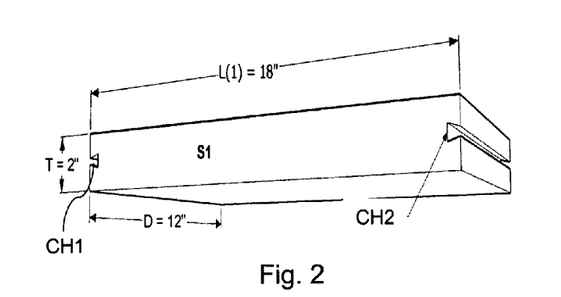
FIGS. 2, 3 and 4 provide perspective views of Surface Members that can be used in the shelf system of FIG. 1. In additional embodiments, Surface Members may be longer than those in FIGS. 2, 3 and 4, as seen in FIG. 22.

The Shelf System 10 in FIG. 1*a* includes three One-Section Surface Members S1-1, S1-2, and S1-3, all of identical size and shape. Referring also to FIG. 2, for the sake of example, Surface Member S1 has a length L(1) of 18 inches, a thickness T of 2 inches, a depth D of 12 inches, and two Channels CH1 and CH2 at opposing ends.

Figure 3:
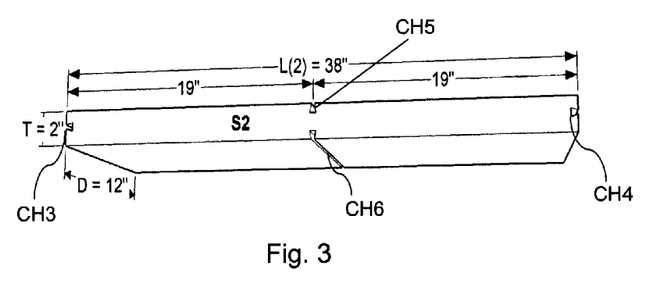

The Shelf System 10 in FIG. 1*a* includes three Two-Section Surface Members S2-1, S2-2, and S2-3 which are all of identical size and shape. Referring also to FIG. 3, for the sake of example, Surface Member S2 has a length L(2) of 38 inches, a thickness T of 2 inches, a depth D of 12 inches, and two Channels CH3 and CH4 at opposing ends. Additionally, two channels CH5 and CH6 on the primary surfaces of Surface Member S2 are spaced at distances ½ of the Length L(2).

Figure 4:
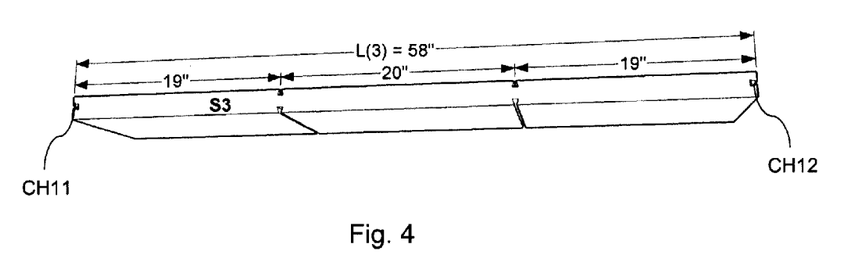

The Shelf System 10 in FIG. 1*a* includes two Three-Section Surface Members S3-1 and S3-2 which are of identical size and shape. Referring also to FIG. 4, for the sake of example, Surface Member S3 has a length L(2) of 58 inches, a thickness T of 2 inches, a depth D of 12 inches and two Channels CH11 and CH12 at opposing ends. The two Channels on each of the primary surfaces of Surface Member S3 are not spaced at distances ⅓ of the length L(3), as described below.

Although not shown in the Shelf System 10 of FIG. 1*a*, Surface Members may span four or more sections and can be used in alternate embodiments. The placement of Channels in Surface Members which span any number of sections is defined below.

In some embodiments, longer Surface Members may contribute more structural integrity and strength than shorter Surface Members, and the placement of longer Surface Members may depend where the load-bearing requirements are concentrated in the final assembly. Generally, the external Horizontal Surface Members (the top shelf and base), and the outermost Vertical Surface Members should be as long as possible, with minimal use of Junctions, as in the Shelf System 10 in FIG. 1*a*.

Figure 5:
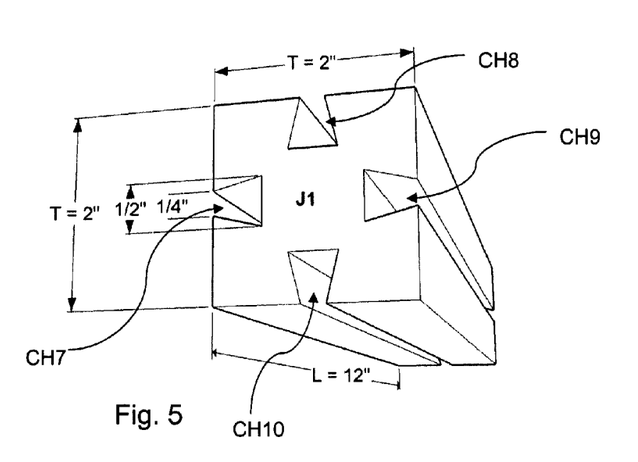
FIG. 5 provides a perspective view of a Junction, J1, that can be used in the Shelf System 10 of FIG. 1.

Referring to FIG. 5, Junction J1 has a square cross section with side thicknesses T of 2 inches and a length L of 12 inches; and four Channels CH7, CH8, CH9, and CH10 are on each lengthwise side. All of these Channels are similarly configured as dovetails, and include an opening dimension of ¼ inch, an interior dimension of ½ inch, and a depth of ½ inch.

In FIG. 6, the Connector C1, which is shown for example, includes width W of 1 inch, a outer height H1 of ½ inch, a central height H2 of ¼ inch, and a length L of 12 inches. This corresponds to the present embodiment of the dovetail Channels as described above.

Figure 7:
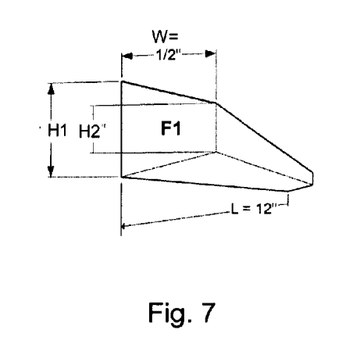
FIG. 7 provides a perspective view of a Filler, F1, that can be used in the Shelf System 10 of FIG. 1.

In FIG. 7, the Filler F1, which is shown for example, includes a width W of ½ inch, a first height H1 of ½ inch, a second height H2 of ¼ inch, and a length L of 12 inches. This corresponds to the present embodiment of the dovetail Channels as described above and shown in FIG. 5.

The length of the Connectors and Fillers are commonly the same as the depth of the Junctions and Surface Members, but other lengths are possible as described below.

The proportions of the Surface Members and the positions of the Channels are described below, where:
 a. L=the standard length of a section, and the length of the shortest Surface Member;
 b. X=the number of sections to be covered by the span; and
 c. T=the thickness of a Surface Member.

In the present embodiment, the length of any Surface Member is defined as a multiplier of a section length; plus the number of section lengths minus 1, multiplied by the thickness of a section, as seen in FIGS. 2, 3, and 4.
 a. Surface Member length=X*L+(X−1)*T Channels bisect all four sides of a Junction, as seen in FIG. 5. Channels also bisect the ends of all Surface Members as seen in FIGS. 2-4. Furthermore, Channels are located on the primary surface of all Surface Members whose length is two sections or more, as follows:
 a. For all Surface Members where X>=2, as seen in FIGS. 3 and 4, the distance between the Surface Member edge and the center of the closest Channel
 b. =L+T/2
 c. For all Surface Members where X>=3, as seen in FIG. 4, the distance between the centers of the middle Channels
 d. =L+T There are three types of ways which the components join to each other:

The first type is a Surface Member to Junction join, which will include the end of a Surface Member butting up against one side of a Junction, as seen in FIGS. 1b and 1d. The use of Junctions between Surface Members enables Surface Members to be connected to each other (with the intermediary Junction) in "in-line" or "common corner" fashion. An example of an in-line connection between Surface Members is seen in FIG. 1d where Surface Members S1-1 and S1-2 connect in-line by intermediary Junction J3. In a "common corner," the ends of two Surface Members connect to adjacent Junction faces so that a "corner" is created between the two Surface Members, as seen in FIG. 1b where a common corner is created between Surface Members S3-1 and S2-3 by intermediary Junction J1.

The second type is a Surface Member to Surface Member connection, which will include the end of one Surface Member butting up against the primary surface of another Surface Member, as seen in FIG. 1c where Surface Member S1-1 abuts perpendicularly to Surface Member S2-1, and no intermediary Junction is required.

The third type is a Filler to empty Channel connection, where a Filler is inserted into an unused Channel to fill the space for a solid look in the final assembly, as seen in FIGS. 1b and 1c, or to enable the attachment of accessories, as described below.

In the present embodiment, a Junction does not join to the primary surface of a Surface Member.

Using the dimensions and connections described above, an infinite number of embodiments can be designed and built. Channel alignment is maintained when a Junction is used to join in-line Surface Members, when perpendicularly abutted Surface Members do not incorporate a Junction in their join, and when Junctions never join to other Junctions.

Securing Accessories

Slight modifications to Fillers and Connectors enable the attachment of a wide variety of accessories without modifying the Surface Members, therefore allowing the unaltered Surface Members to be reconfigured without exposing evidence of previous accessory attachment.

Figure 8:
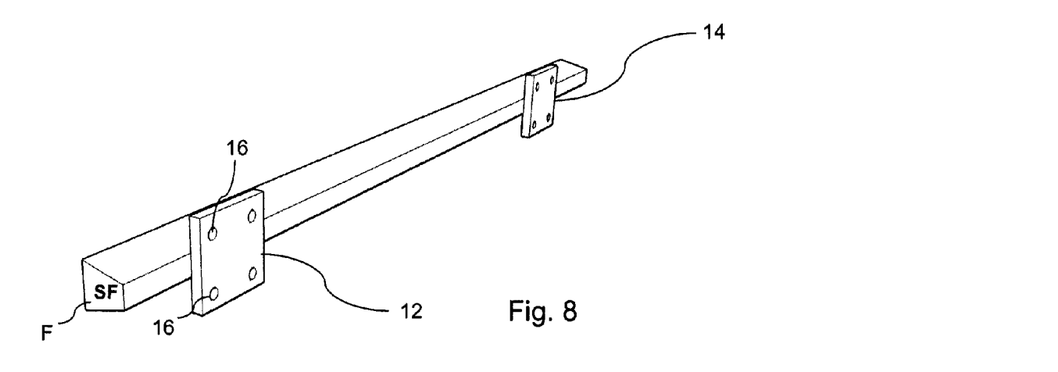
FIG. 8-10 provide perspective views of attachment Fillers and Connectors for connecting to Surface Members and Junctions.

Referring to FIG. 8, accessories may be secured to the Shelf System 10 using a Primary Surface Attachment Filler, SF. In one embodiment, the Primary Surface Attachment Filler SF includes a Filler F with one or more Mounting Plates 12 and 14. The Mounting Plates 12 and 14 are connected along the depth of the Filler, enabling the attachment of accessories lengthwise along the depth of the final assembly. The Mounting Plates 12 and 14 include attachment mechanisms 16 for connecting to what are generally referred to as accessories, including drawer assemblies, feet, and brackets for other surfaces; or for direct attachment to other surfaces. In the present embodiment, the attachment mechanisms 16 are screw holes for screwing the accessory to the Mounting Plates 12 and 14. Other attachment mechanisms include hook and loop fasteners, a portion of a European-style cabinet door hinge, adhesive coated surfaces, and other mechanisms known to those with ordinary skills in the art.

Figure 9:
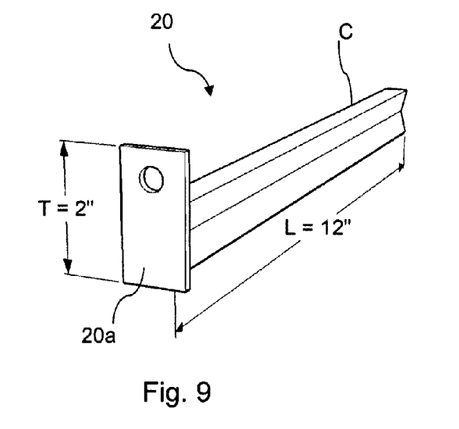
Figure 10:
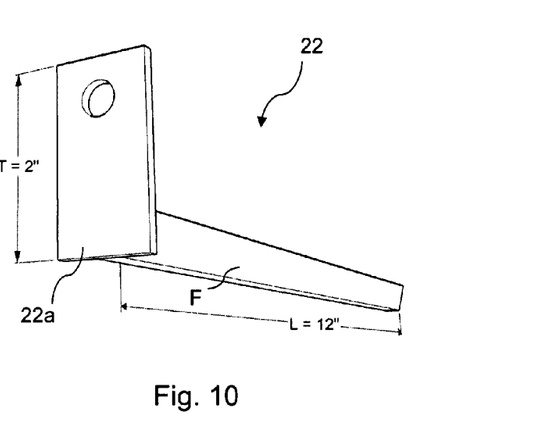

Referring to FIGS. 9 and 10, accessories may also be secured to the Shelf System 10 using an End Attachment Filler 20 (FIG. 9) or an End Attachment Connector 22 (FIG. 10). These End Attachment components include attachment mechanisms that enable the attachment of accessories on the ends of Connectors or Fillers. For example, End Mounting Plates 20a and 22a join to the end of a Connector C or a Filler F, respectively, and are used to attach a wide variety of accessories. In the present embodiment, End Mounting Plates are proportioned so that the plate is concealed from view in the final assembly.

Figure 11:
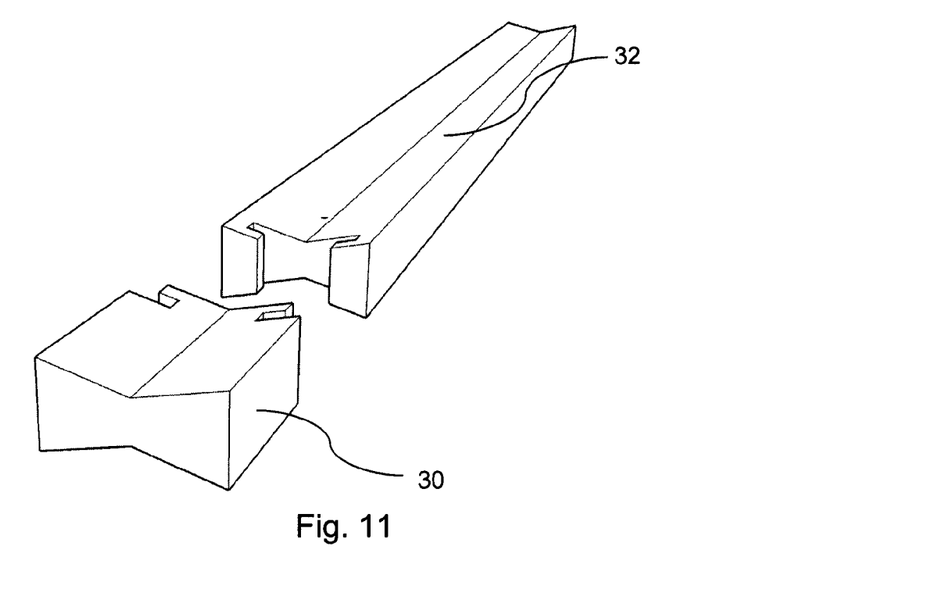
FIGS. 11-12 show alternative ends for a Connector.
Figure 12:
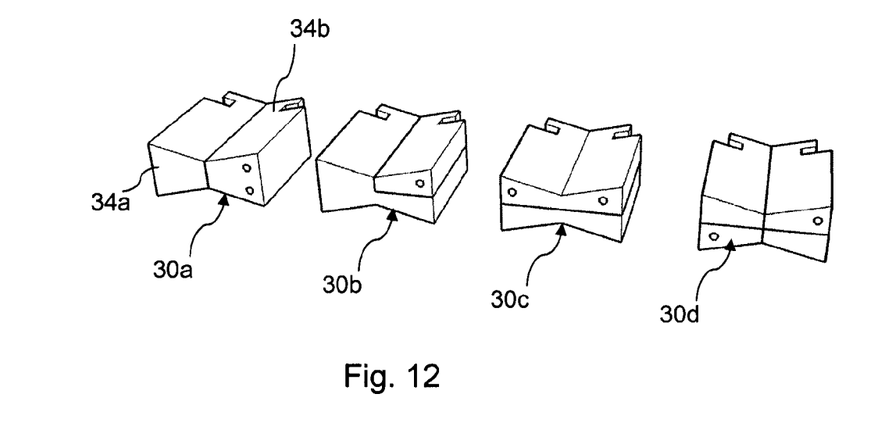

Referring to FIG. 11, accessories may also be secured to the Shelf System 10 using a Connector Shaft End 30, which connects to a Shaft End-enabled Connector 32. The Connector Shaft End 30 provides precise, accurate and repeatable attachment of a wide variety of accessories. The Connector Shaft End 30 is notched so that it mates with a compatible notch in the end of a Shaft End-enabled Connector 32, as shown in FIG. 11. Although not shown in FIG. 11, Filler Shaft Ends and Shaft End-enabled Fillers may be similarly configured. Referring to FIG. 12, various Connector Shaft Ends are shown, with reference numerals 30a, 30b, 30c, and 30d. The Connector Shaft Ends include attachment mechanisms, such as one or more screw holes for securing accessories. In the present embodiment, the placement of attachment mechanisms (holes) on Connector Shaft Ends is such that no unused attachment mechanisms are visible in the final assembly (as seen in FIG. 12). For example, the Connector Shaft End 30a may include a first portion 34a made of a first material (e.g., wood) and a second portion 34b made of a second material (e.g. plastic). Shaft Ends may also be used for purely aesthetic purposes so that the visible end may utilize visually desirable materials, while materials desirable for construction (strength or cost) are used internally. In another embodiment, the combination of Shaft Ends and Shaft End-enabled Fillers and Connectors may also be manufactured as a single unit.

Figure 13:
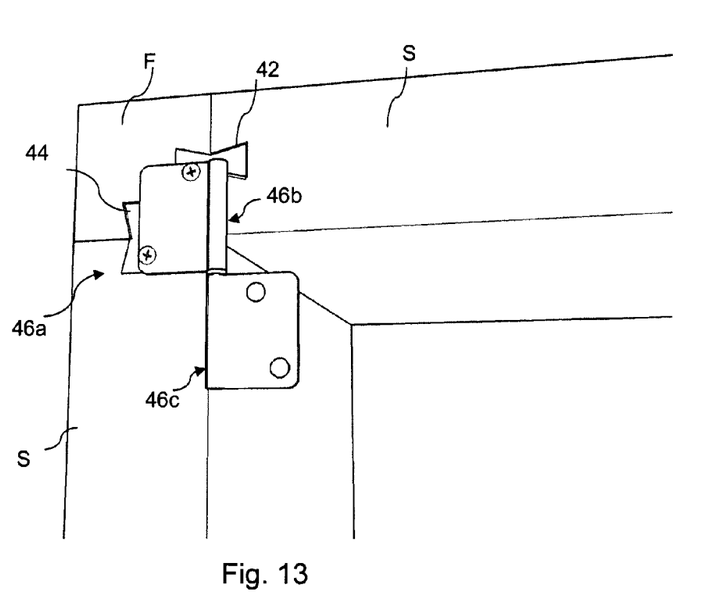
FIG. 13 shows a Connector end being used to connect a hinge.

Referring to FIG. 13, accessories may also be secured to the Shelf System 10 using a Connector Hinge 46a. In FIG. 13, the Top Hinge Assembly 46b attaches to two Connector Shaft Ends 42 and 44. The Lower Hinge Assembly 46c is rotatably connected to the Upper Assembly 46b and would be connected to an accessory such as a door.

Additional Components

Different additional components can be connected to the Shelf System 10. For example, a Connector Conversion is a Connector where the two engaging sides are of different dimensions (as described above). Connector Conversions enable the joining of unequally-channeled Surface Members and Junctions.

Figure 19:
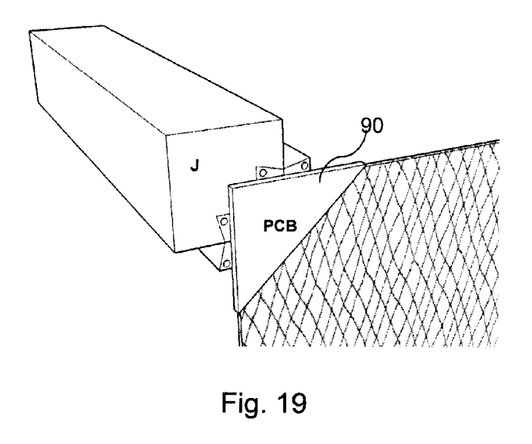
FIG. 19 provides a perspective view of a Corner Panel Bracket which attaches to one or more Shaft Ends.

Panel Brackets enable the attachment of different varieties of Panels on any exterior surface of the final assembly for a plurality of reasons, including structural considerations and aesthetics. Corner Panel Brackets secure corners of Panels and Edge Panel Brackets secure Panel edges. Panels may be orientated on any plane. Panels may also be secured such that their primary surface attaches to the final embodiment, or so that their primary surface is exterior to the final embodiment. Panel Brackets secure to the ends of Connectors or Fillers (by mechanisms such as Shaft Ends 30 in FIGS. 11 and 12) or to Primary Surface Attachment Fillers (by mechanisms such as Mounting Plates 12 and 14 in FIG. 8). Referring to FIG. 19, a Panel corner is secured to the Shelf System 10 by use of a Corner Panel Bracket 90 which attaches to Shaft Ends.

Paneling enables the "built in" look by covering gaps between the final assembly and nearby walls.

Securing Buckles are modified turnbuckles that have large surface area pads and are used to secure the final assemblies into fitted spaces. Used together with side and top Panels, a "built in" look can be achieved.

Crown Moldings and Base Moldings join Primary Surface Attachment Fillers on the sides of final embodiments, and to Shaft Ends on the front side of the final embodiment.

Feet attach to Primary Surface Attachment Fillers on the bottom of a final assembly.

Posts

Posts are Surface Members whose dimensions have been changed, e.g., their depth has been reduced to equal the thickness of Surface Members and Junctions in the embodiment, so that a column is achieved. Typically, two Posts will replace one Surface Member to maintain the structural integrity of a final assembly, as shown by Posts P1-6 and P1-7 in blowout FIG. 14*a* of FIG. 14.

Figure 14:
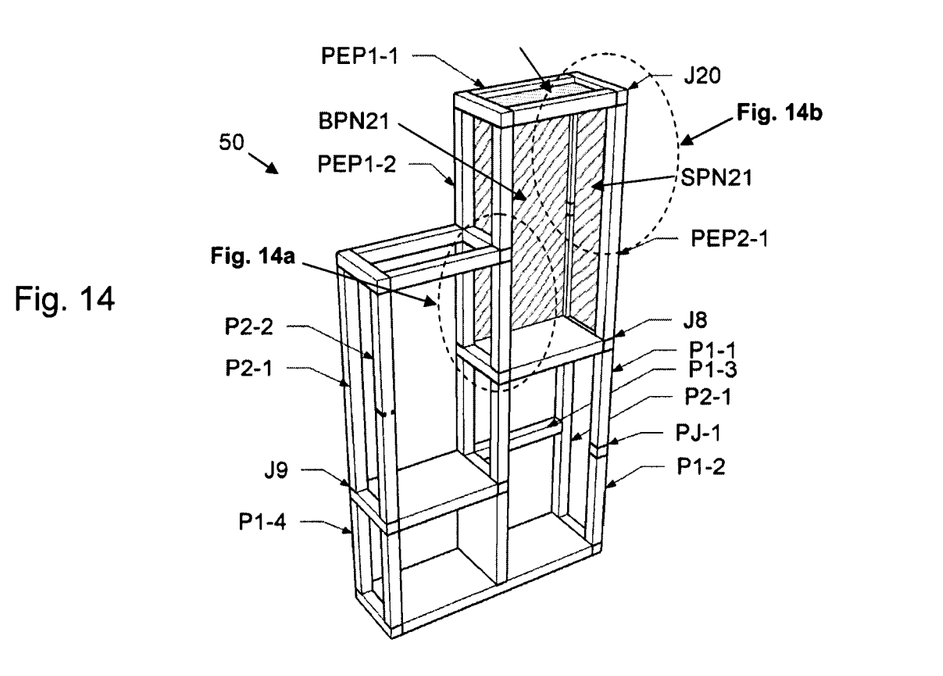
FIGS. 14, 14a, and 14b provide perspective views of a shelf system according to another embodiment of the present invention.

Posts may be orientated horizontally or vertically. Referring to FIG. 14, Post P1-1 is orientated vertically, whereas Post P1-3 is orientated horizontally.

The lengths of Posts follow the same rules as the lengths of regular Surface Members, and the placement of Channels within Posts also follow the same rules as regular Surface Members. A two-section Post P2-2 is shown in FIG. 14, with Channels in the same direction as other Channels in the embodiment, and bisecting the primary surfaces.

Figure 14A:
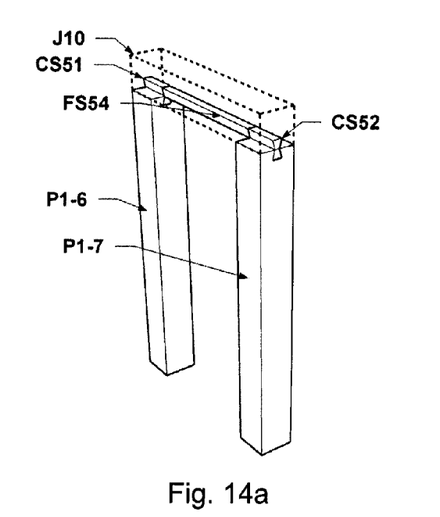

Posts join to Surface Members, Junctions, and other Posts by shortened Connectors. Referring to FIG. 14*a*, Posts P1-6 and P1-7 join by shortened Connectors CS51 and CS52 (respectively) to Junction J10 (shown in phantom to reveal details). A Shortened Filler FS54 fills the remaining Channel of Junction J10. The combination of shortened Connectors CS51 and CS52 and the shortened Filler FS54 may also be manufactured as a single unit.

In addition to joining to regular Junctions and Surface Members, Posts may be joined to each other using Post Junctions. In the present embodiment, Post Junctions are regular Junctions whose depth has been shortened to equal their height and width (cubes). Post Junctions enable joining Posts without intermediary Surface Members or regular Junctions. The rules for how Posts may join to Post Junctions, regular Junctions, and Surface Members are similar to the rules for how Surface Members may join to other components. FIG. 14 shows an inline Post to Post join via a Post Junction, where Post P1-1 joins to Post Junction PJ-1, and Post Junction PJ-1 joins to Post P1-2, thereby joining Posts P1-1 and P1-2. FIG. 14 also shows an inline Post to Post join, this time using a regular Junction where Post P1-4 joins to Junction J9, and Junction J9 joins to Post P2-1, thereby joining Posts P1-4 and P2-1. Although not seen in FIG. 14, abutted perpendicular Post Joins and common corner Post Joins are also possible.

Panes

Like Panels, Panes may be used to enclose portions of the embodiment for appearance and function. Whereas Panels connect on the front or back side of the embodiment and may "cross over" components (Surface Members, Junctions, or Posts), Panes fit between these components and may not cross over them. Embodiment 50 in FIG. 14 includes 3 Panes: BPN21, SPN21, and TPN11. When a Pane is placed between two Posts, much of the functionality and purpose of a Surface Member is realized, with additional benefits from the different materials and different appearance. A wide variety of materials may be used in Panes such as wood, glass, and plastic.

Figure 14B:
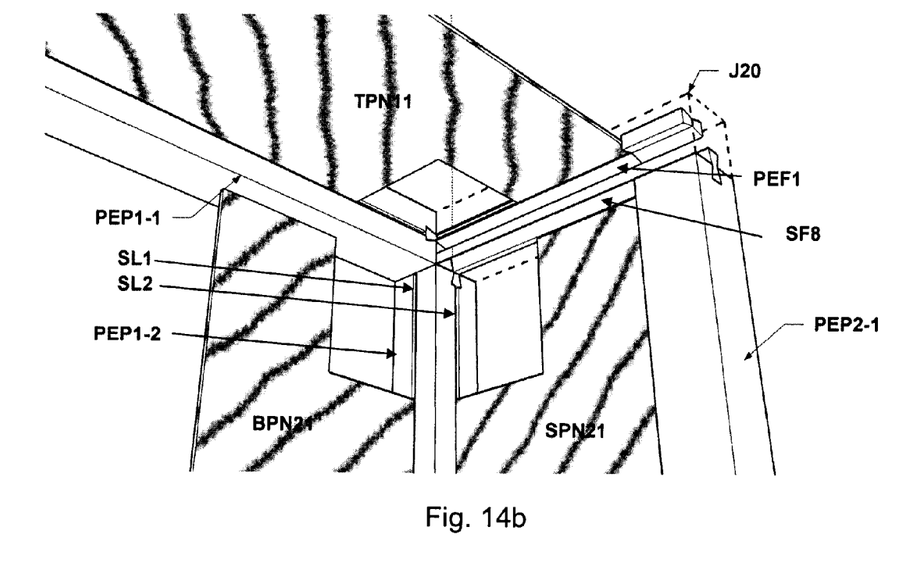

Panes may span any number of sections, and may be oriented on any pair of axes. A 2×1 section Side Pane (Y and Z axes) SPN21, is seen in FIGS. 14 and 14*b*. A 2×1 section Back Pane (X and Y axes) BPN21, is seen in FIGS. 14 and 14*b*. A 1×1 section Top Pane (X and Z axes) TPN11, is seen in FIGS. 14 and 14*b*.

Slots and Pane Enablement

A Pane is secured to the embodiment 50 by insertion between two receiving Slots. A component (Surface Member, Post or Junction) which contains said Slot is "pane enabled."

Pane Enabled Posts are Posts with one or more Slots to enable the insertion of the edge of one or more Panes. Referring to FIGS. 14 and 14*b*, the one-section Pane-enabled Post PEP1-2 contains two Slots SL1 and SL2, which receive Panes BPN21 and SPN21 (which are cut away to show detail). Pane Enabled Post PEP2-1 provides a single Slot for Pane SPN21.

Junctions may be enabled to include Slots to receive Panes by use of Pane Enabled Fillers. A Pane Enabled Filler has a Slot lengthwise on the exposed surface of the Filler. In FIG. 14*b*, Pane Enabled Filler PEF1 is shown inserted into the left side of Junction J20 (hidden in FIG. 14*b* to show detail) and receives Pane TPN1.

Although not shown in embodiment 50, Pane-enabled Surface Members contain one or more Slots to receive Pane edges.

In the present embodiment 50, two edges of Panes slide into Slots, but Slots for the top and bottom edges of Panes are not included. As shown in FIG. 14*b*, Slots SL1 and SL2 in Pane Enabled Post PEP1-2 are for Panes NPN21 and SPN21, but there are no Slots for the top edges for Panes NPN21 or SPN21 in Post PEP1-1 or in the Shortened Filler SF8 in Junction J20. However, in some embodiments, Slots may exist for all Pane edges. Also, in some embodiments, Slots can be shaped as Channels. In embodiment 50, the Slots are ⅛ inch wide, and are ¼ inch deep.

The dimensions of Panes depend on how many sections they will span and on which sides of the Pane slide into the Slots. The height and width of Panes will equal the lengths of Junctions or Surface Members which span the same number of sections, with extra length to accommodate the insertion of the edge into Slots (½ inch to accommodate insertion of two ¼ inch edges in the present embodiment).

Additional Alternative Members

Figure 15A:
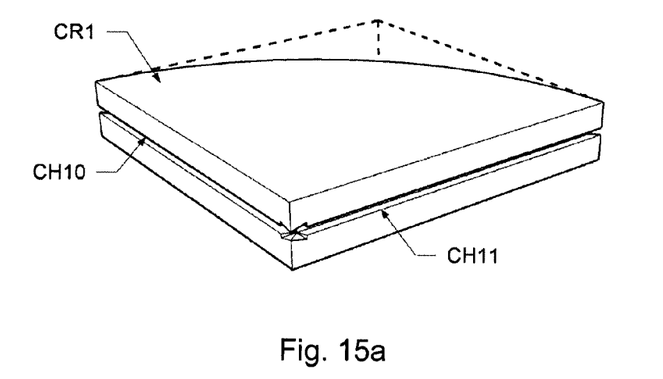
FIGS. 15a-15b provide perspective views of alternative Surface Members for use in corners.

Referring to FIG. 15*a*, a Corner Surface Member is a special instance of a Surface Member, whose primary surface turns to accommodate wall corners (or for aesthetics in freestanding units). Corner Surface Members have Channels only on the unexposed interior edges and have channel-less exterior edges. The outer edge of the Corner Surface Member may be smoothly rounded (as in FIG. 15*a*), but may also have sharp corners (shown in phantom in FIG. 15*a*). A 90-Degree Corner Surface Member 121 is shown in assembly 120 in FIG. 22. Corner Surface Members may be "flipped over" so that the new angle is the conjugate angle of the old angle (i.e. the construction of a 90-Degree "Inside" Corner Surface Member is exactly the same as a 270-Degree "Outside" Corner Surface Member). Furthermore, Corner Surface Members may incorporate acute or obtuse angles.

Figure 15B:
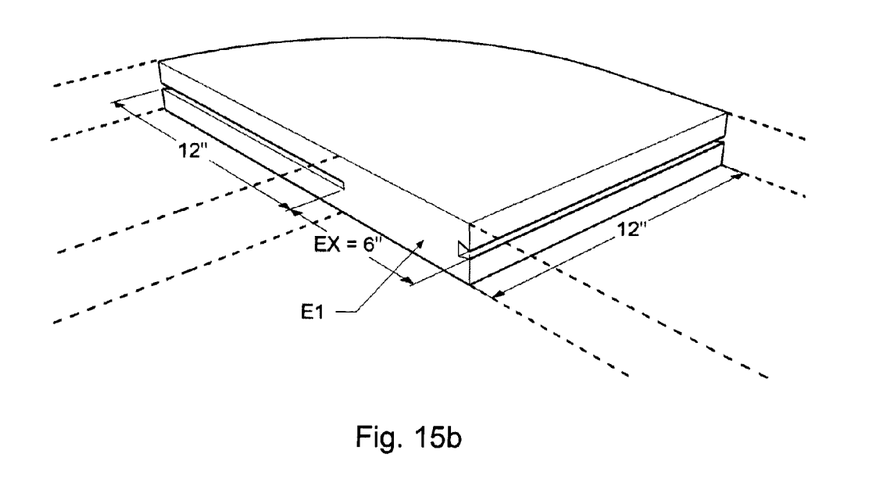

Referring to FIG. 15b, Extra Length Corner Surface Members provide a way to extend the overall length of a final assembly by increments less than one standard section so that it will fit within or around the corners on contiguous wall spaces. In FIG. 15b, the length of the final assembly was extended by 6 inches using the 6 inch extension, EX, on the extended edge E1 (attached Surface Members shown in phantom).

Figure 16:
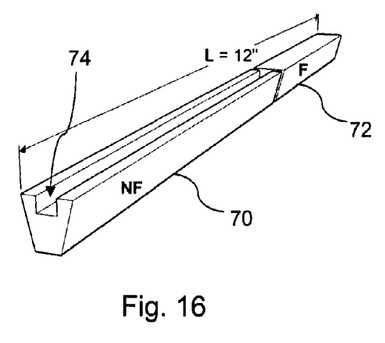
FIGS. 16-18 show various components with notches or grooves for different uses.

Notches are used on Fillers and Connectors to route wiring, cables, or tubing through the Channels to desired locations throughout the final embodiment. Notched Connectors and Notched Fillers may be combined with shortened Connectors and Fillers so that the notch is not visible from the preferred view of the embodiment. Referring to FIG. 16, a Shortened Notched Filler 70 (and Notch 74) is shown in sequence with a Regular Filler 72 (and allowing a gap for the wire to exit the interior) such that the total depth is the depth of the Surface Members in assembly 10 in FIG. 1a.

Figure 17:
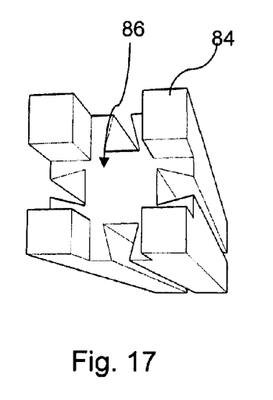
Figure 18:
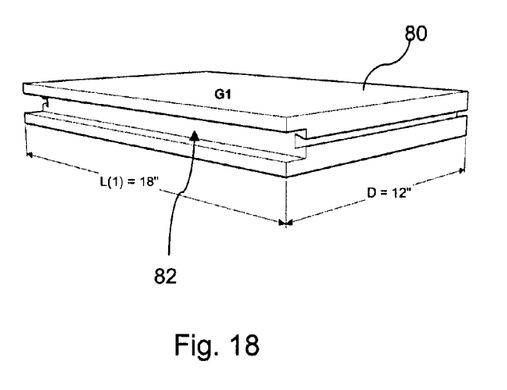

Referring to FIGS. 17-18, Grooved Members are Surface Members or Junctions that have a Groove on the back side for concealing wires, cables, and so on. Referring to FIG. 18, a Grooved Surface Member 80 contains a single groove 82 along the full length of the back side. Four groove options are available for Grooved Junctions: a Cross Groove Junction 84 includes grooves 86 which open up to all sides of the Junction (FIG. 17); a T Groove Junction opens up to three sides of the Junction; a Corner Groove Junction opens up to two adjacent sides of the Junction; and an In-line Groove Junction opens up to opposing sides of the Junction. By applying the plurality of Grooved Member options, final assemblies can be configured to allow grooves wherever needed on the back side, while making them invisible from the preferred views.

Additional Furniture Systems

Figure 20:
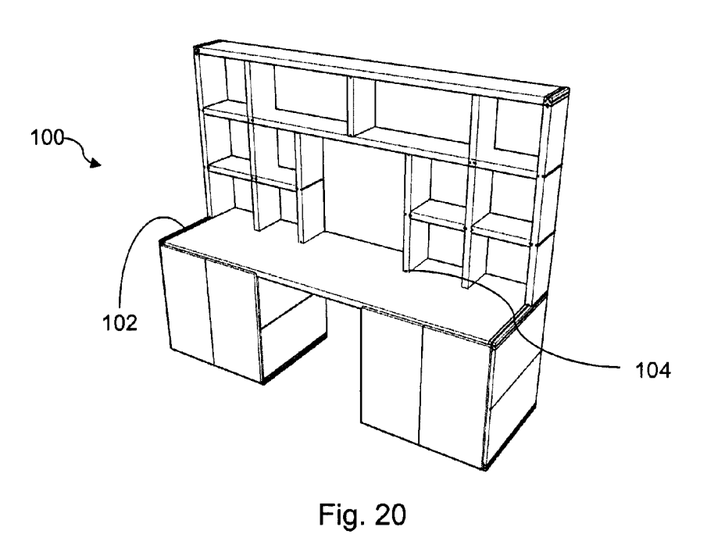
FIGS. 20-22 provide perspective views of modular furniture systems according to additional embodiments of the present invention.

FIGS. 20-23 provide additional furniture system designs that use many of the components described above. Referring to FIG. 20, a desk 100 is shown combining "deep" (36 inch) Surface Members at and below desk height, with shallower Surface Members (12 inch) above the desk surface, providing a convenient desk workspace and storage with ideally sized shelving on the upper section.

Figure 21:
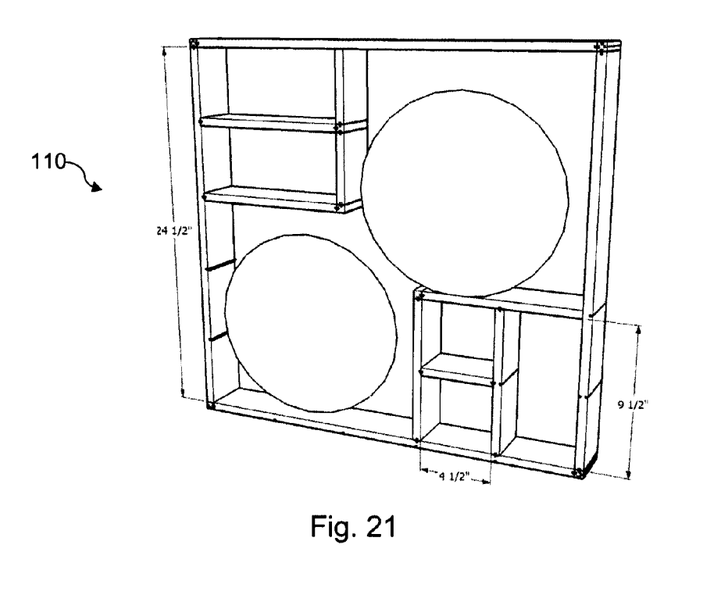

FIG. 21 shows a wall mounted display case 110. Reducing the scale of the preferred embodiment by about 75% (3-inch depth, 4-inch section length, ½-inch thickness) yields ideal dimensions for display cases for dishes, schottisches, memorabilia, and so on.

Figure 22:
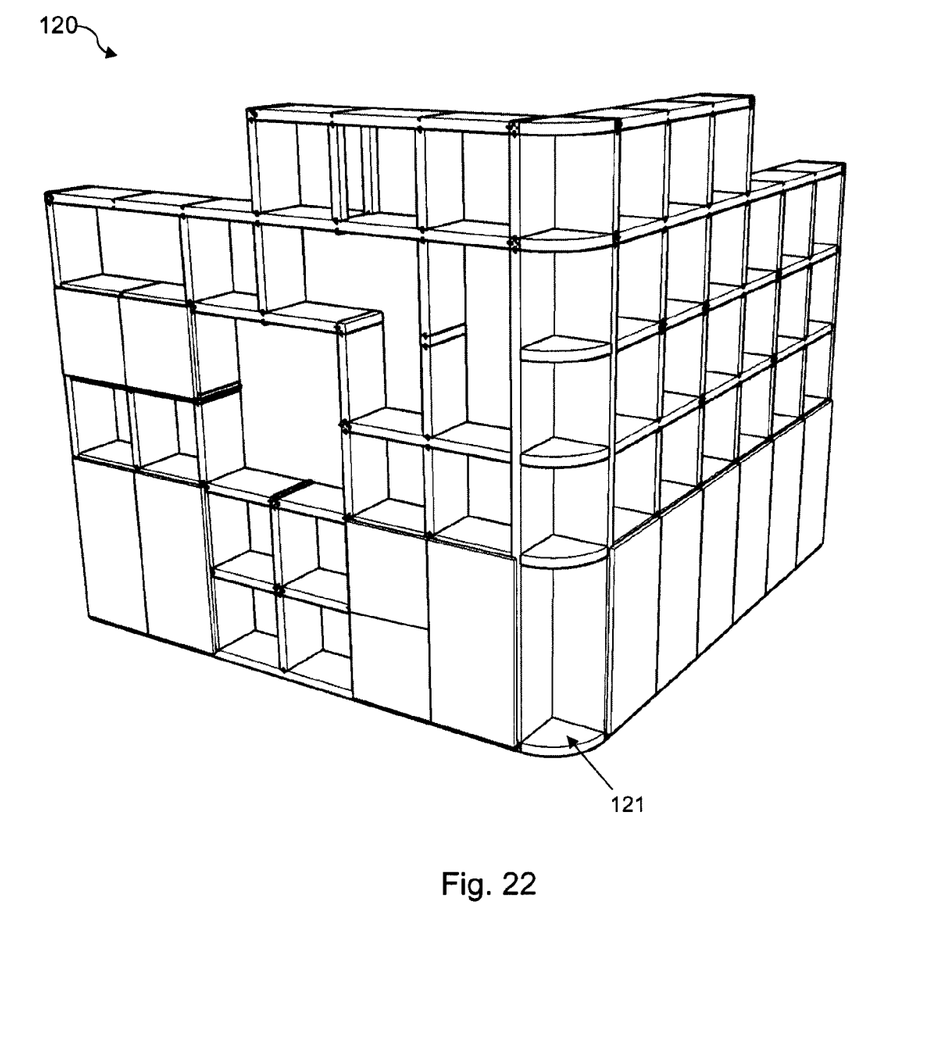

FIG. 22 shows a large wall unit with doors and corner Surface Members.

Another alternate embodiment involves the use of variable Surface Member thicknesses. To accomplish various styles in the final assembly, interior and exterior members may have different thicknesses. For example, interior Surface Members may be one inch thick, combined with exterior Surface Members that are two inches thick. Shifting thicknesses within a final assembly may require Connector Conversions.

Business Method

Users may design their final assembly and produce required component lists using a variety of methods. The standardized components and design rules discussed in some of the embodiments above make this process well suited for design using paper or computer based design tools, and accurate component lists can be easily interpreted from drawings or generated from computer models. Another design business method is the use of a miniature embodiment enabling users to configure miniature models and then upsize their design.

Figure 23:
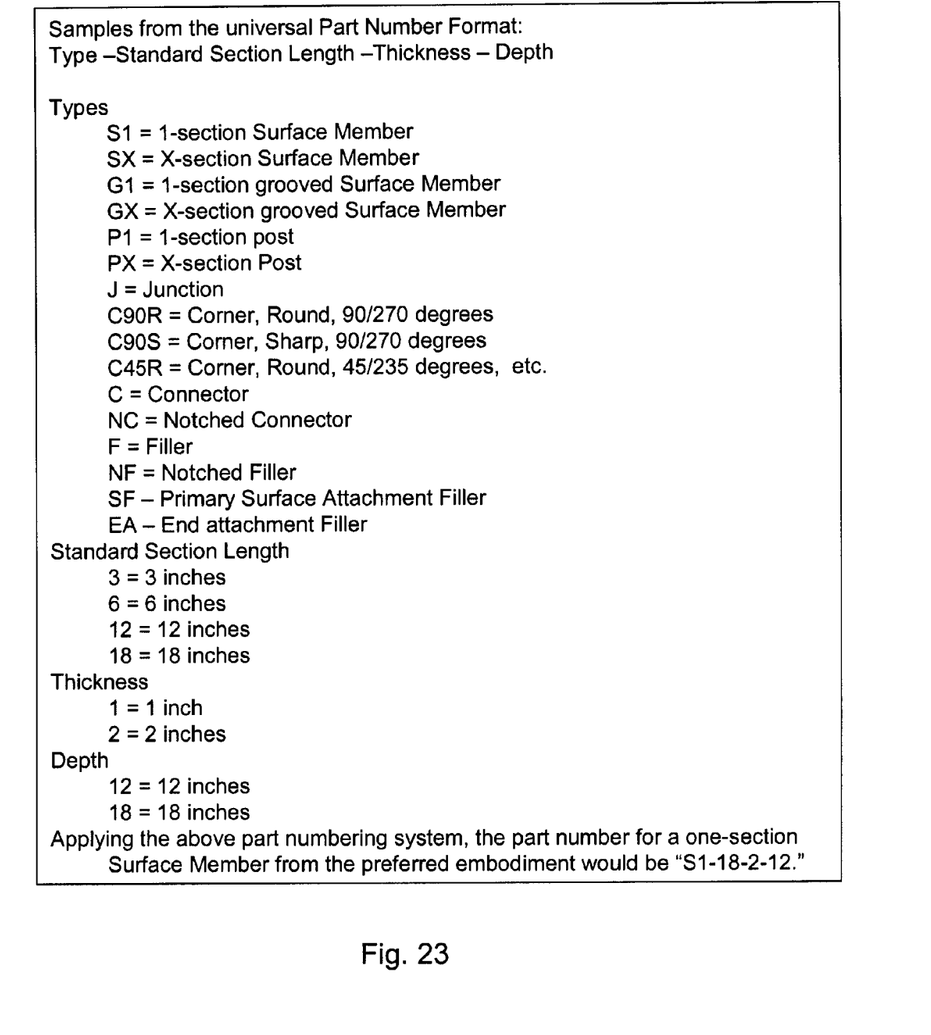
FIG. 23 is parts list for a kit to be used in ordering and assembling a modular furniture system, according to one embodiment of the present invention.

Referring to FIG. 23, a single part-numbering system can uniquely describe any individual part, and parts can be defined with a one part-numbering system. Segments of the part-numbering system would include the type of part, the standard section length, standard thickness, and depth.

Advantages

Different embodiments described above may include one or more of the advantages listed below. It is understood that no advantage is considered critical to the invention.

One advantage is the placement of Channels along all sides of Junctions and at all conceivable connection points on Surface Members, which ensures connectability at any touch point.

Another advantage is that Surface Member lengths are defined as a function of the thickness of the Surface Member, enabling Channels to align and connections to be made at any conceivable touch point.

Another advantage is that a very small set of standardized components accommodates a wide variety of embodiments and can be reused in drastically different future embodiments.

Another advantage is that combinations of any group of components can be factory preassembled (so that the components can be taken apart) or manufactured as a single unit; thereby simplifying final assembly for the end users.

Another advantage is that because the attachment of accessories does not require alterations of modifications to Surface Members, Surface Members may be reconfigured without evidence of previous accessories.

Another advantage is the use of full-depth Channels and Connectors whose inherent strength through the distribution of the load across greater distances than connection systems in other furniture systems enables 1) a wide variety of embodiments, 2) smaller and simpler engaging elements, and 3) less need for strong materials.

Another advantage is that traditional mechanical connections (screws, bolts, nails, stops, fasteners, locks, special connectors, and so on) are not required (except for accessory attachment).

Another advantage is that the assembly of many embodiments requires no tools (attachment of accessories may require tools).

Another advantage is that it is easy to add or remove interior components from a previously assembled furniture system, or otherwise reconfigure it in drastic ways while maintaining structural integrity.

Another advantage is that the furniture system easily allows the creation of embodiments with multiple depths.

Another advantage is that the furniture system facilitates assembly within specific wall lengths and around inside and outside corners.

Another advantage is that the furniture system includes dual-purpose Surface Members, which can serve as both Horizontal Surface Members and Vertical Surface Members, and may also serve the function of Junctions (in perpendicular abutted Surface Member connections).

Another advantage is that the furniture system can be "built-in" (by use of Securing Buckles and Panels) and later removed with little to no evidence of its existence in either the location of the install or in the components.

Another advantage is that the furniture system components can be used in either wall shelves or free-standing units.

Another advantage is that the furniture system provides hidden routing of wires, cables, and so on by use of concealed Notches and Grooves.

Another advantage is that the furniture system can be described using a universal part numbering system to describe every conceivable part, and to produce accurate shopping lists using said part numbers.

Another advantage is that the furniture system provides easy design and construction in previously difficult settings, such as inside and outside wall corners, stepped up to follow cathedral ceilings, and so on.

Another advantage is that the use of long Surface Members increases strength, reduces manufacturing costs, and enables designs which would otherwise be structurally inferior if using only pieces of one or two standard lengths (as many other modular furniture systems do).

I claim:

1. A modular furniture system comprising:
   first and second surface members, each of a length x and a width z;
   third and fourth surface members, each of a length y and a width z;
   a fifth surface member of length y;
   four junctions, each with a square cross section of thickness z; and
   ten connectors;
   wherein, $x = 2*y + z$;
   wherein each junction has at least two channels along its depth, and each surface member has a channel along at least two opposing outer edges, the channels being configured to slidingly engage with one of the connectors;
   wherein the channels are positioned, and the connectors are further configured to engage with two channels, to secure a surface member with a corresponding junction;
   wherein the first and second surface members each include a channel at a midpoint of their length, and the fifth surface member includes channels at opposing outer edges; and
   wherein the ninth and tenth connectors are configured to engage with the channels of the fifth surface member and with the channels at the midpoint of the first and second surface members to secure the fifth surface member between the first and second surface member.

* * * * *